Oct. 7, 1969   R. W. YOUNG   3,471,408
LASERABLE MATERIAL
Filed Oct. 4, 1965

INVENTOR.
ROBERT W. YOUNG
BY James P. M. Andrews
ATTORNEY

United States Patent Office 3,471,408
Patented Oct. 7, 1969

3,471,408
LASERABLE MATERIAL
Robert W. Young, Woodstock, Conn., assignor, by mesne assignments, to American Optical Corporation, Southbridge, Mass., a corporation of Delaware
Filed Oct. 4, 1965, Ser. No. 492,448
Int. Cl. C09k 1/10; C03c 3/10
U.S. Cl. 252—301.4                               8 Claims

ABSTRACT OF THE DISCLOSURE

A neodymium doped silicate glass composition for utilization as a laserable material which glass has a fluorescent lifetime within the range of 730 to 840 microseconds and a relatively low viscosity with Lillie flow points within the range of 870° centigrade to 910° centigrade. The improved low viscosity, long fluorescent lifetime laser glass results from a composition containing certain combinations of the oxides of heavier and lighter monovalent alkali ions, namely, rubidium, cesium and mixtures thereof combined with sodium and potassium and coupled with proper amounts of barium oxide and lead oxide and mixtures thereof.

---

Figure 1:
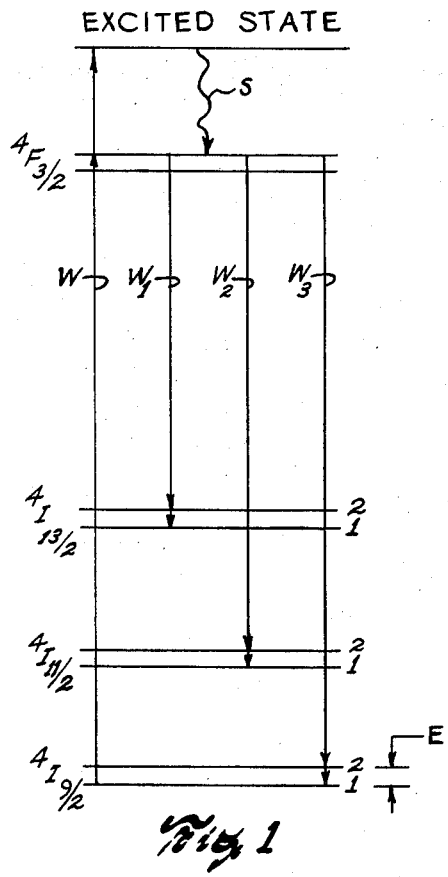

The field of this invention is that of laserable materials and the invention relates more particularly to novel and improved laserable materials of a silicate glass type.

Laser materials of a non-crystalline atomic structure such as glass are usually more easily fabricated into laser elements and components than corresponding crystalline laser materials. Laser elements made from the non-crystalline laser materials also exhibit many well known and desirable operational characteristics. However, in order to facilitate the manufacture of laser elements, it is desirable to employ non-crystalline laser materials having relatively low viscosities such that the materials can be fabricated into laser elements by conventional glass-handling techniques.

In many laser applications it is also desirable that a large amount of energy be stored in the form of excited ion states. Maximized energy storage is particularly desirable in so called Q-switching resonant laser structures or where large amplitude relaxation oscillations are to be generated. In this regard, note that the lifetime for fluorescent emission of the materials plays a significant role in the amount of energy storage which may be attained in a given volume of laserable material. Therefore any increase of fluorescent lifetime in laser materials is highly beneficial for increased energy storage.

Co-pending patent application, Ser. No. 410,209, filed Nov. 10, 1964 entitled Laserable Material, and assigned to the same assignee as the present application, discloses laserable materials having fluorescent lifetimes substantially greater than those previously known in the art. These increased fluorescent lifetimes are attained by the use of heavier monovalent alkali ions such as rubidium, cesium and potassium and heavier divalent metal ions in silicate glass compositions incorporating neodymium as the active laser ingredient. However these ingredients usually impart relatively high viscosities to the resulting glass compositions so that they have been somewhat difficult to fabricate into laser components by conventional glass-handling techniques.

On the other hand, co-pending patent application Ser. No. 410,126 filed Nov. 10, 1964 entitled Laserable Material, and assigned to the same assignee as the present application, discloses other laserable materials having sufficiently lower viscosities which facilitate processing the laserable materials by conventional glass-handling techniques. These lower viscosity glasses are attained by the use of heavier potassium alkali ion combined with the oxide of a lighter alkali ion comprising sodium or lithium in a silicate glass composition incorporating neodymium as the active laser ingredient. However, these other laserable materials have fluorescent lifetimes which, although adequate for many purposes, are somewhat lower than the fluorescent lifetimes of the materials disclosed in the first copending application noted above.

It is an object of this invention to provide relatively fluid silicate glass laserable materials suitable for convenient fabrication of laser elements or components and exhibiting sufficiently longer fluorescent lifetimes than can be readily attained in prior art materials of comparable viscosity.

It is a further object of this invention to provide silicate glass laserable materials exhibiting high fluorescent lifetimes and having sufficiently low viscosities to substantially facilitate processing of the materials by conventional glass-handling techniques.

It is an additional object of this invention to provide improved low viscosity, high fluorescent lifetime silicate glass laserable materials having trivalent neodymium therein as a source of active lasterable ions.

Figure 2:
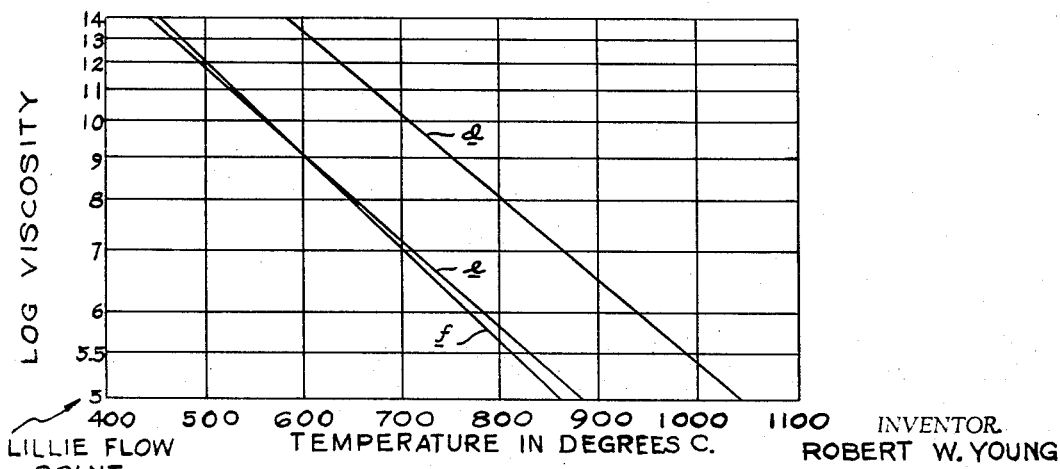

Other objects, advantages and details of the laserable materials provided by this invention appear in the following detailed description of preferred embodiments of the invention, said description referring to the drawings in which:

FIG. 1 represents an energy level diagram used in illustrating a desirable operational characteristic attainable by a laserable material embodying the prsent invention; and FIG. 2 graphically represents the viscosities at different temperatures of the laserable materials provided by this invention, compared to the viscosities at said temperatures of the laserable materials disclosed in the aforesaid copending applications.

The amount of energy storage attained by a laser material is related to the difference between the number (i.e. "population") of excited ions in an upper energy level and the number or population of unexcited ions present in or remaining at a lower energy level. When the population of the upper energy level exceeds that of the lower energy level upon which an emissive transition terminates, an operative condition conveniently referred to as a population inversion prevails. The minimum value of population inversion M required for laser action to begin is a function of the fluorescent lifetime of a laserable material as expressed by the relation $$M \alpha \gamma / Q \qquad (1)$$

where $\gamma$ is the radiative lifetime of the fluorescing ion and $Q$ is a measure of the ratio of energy storage to energy dissipation per irradiation light cycle.

Radiative lifetime may be expressed as the reciprocal of the probability of radiative transition from an excited level to a lower energy level within one unit of time. It will be evident from the relation just expressed that, for a given value of $\gamma$, decreasing the value of $Q$ enables more energy to be stored in the inverted ions of a given volume of laserable material before laser action can begin; and further that the quantity of energy which can be stored, for any value of $Q$, is increased by increasing the fluorescent lifetime $\gamma$. When the laserable material is irradiated with light energy of appropriate wavelength, each ion which absorbs a photon of light energy is excited from a lower to a higher energy level and then usually experiences a non-radiative transition to an intermediate energy level where the net resultant energy remains stored in the excited ion. The total energy that can be stored in intermediate energy level excited ions is roughly proportional to the photonic energy absorbed in a time equal to the fluorescent lifetime of the laserable material. While the total stored energy can thus be increased by increasing the intensity of the radiating light energy, the maximum intensity of conventional light sources is limited for well known reasons. Prolonged duration in the application of the irradiating light energy to the laserable material is of no avail in increasing the energy storage for the reason that the fluorescent lifetime establishes a limit on the maximum energy which can be stored before laser action begins as noted above. Accordingly, any increase of fluorescent lifetime of the laserable material contributes an important increase in the amount of energy storage obtainable from conventional irradiation light sources.

The applicants in the copending application first mentioned above discovered that the fluorescent lifetime $\gamma$ of a silicate glass containing an active laser ingredient is substantially increased by the use of heavier monovalent alkali ions such as rubidium, cesium and potassium together with the use of heavier divalent metal ions. For example, fluorescent lifetimes in excess of 825 microseconds have been attained in trivalent neodymium doped silicate glasses containing rubidium, cesium or potassium and mixtures thereof as compared to fluorescent lifetimes of approximately 500 microseconds in prior art trivalent neodymium doped glasses using sodium as the alkali ion. The optimum fluorescent lifetimes are obtained in these glasses when the glass content of the heavier monovalent alkali oxides is relatively high on the order of 12 mol wt. percent. However these glasses have Lillie flow points (log viscosity 5) on the order of 1050° C. and are somewhat difficult to process in fabricating laser components by conventional glass-handling techniques.

On the other hand, the applicants in the second copending application mentioned above discovered that adequate fluorescent lifetimes can be attained in low-viscosity silicate glass containing an active laser ingredient where the monovalent alkali oxide content of the glass is substantially made up of potassium oxide in combination with the lighter alkali oxides of sodium or lithium. For example, fluorescent lifetimes on the order of 600 microseconds have been attained in such glasses containing alkali oxides of potassium and sodium or of potassium, sodium and lithium within specific ranges. These glasses have Lillie flow points (log viscosity 5) on the order of 860° C. and are much more easily fabricated into laser components by conventional glass-handling techniques.

The present applicant has now discovered that improved laserable materials can be made by the use of certain combinations of heavier and lighter alkalies, namely rubidium and/or cesium combined with sodium, provided that use of these alkali combinations is coupled with use of the proper amounts of barium oxide and/or lead oxide. These improved laserable materials attain fluorescent lifetimes ranging from 730 to 840 microseconds and therefore compare favorably in this respect to the laserable materials disclosed in the copending application first mentioned above. These materials substantially exceed the fluorescent lifetimes achieved by the materials of the second copending application.

On the other hand, the improved laserable materials of this invention attain relatively low viscosities and have Lillie flow points ranging from 870° C. to 910° C. These materials thus compare favorably, with respect to viscosity, to the materials disclosed in the second copending application mentioned above and are substantially lower than the viscosities of the materials of said first copending application. This is shown by comparison of curve $e$ in FIG. 2, which illustrates the viscosity of a typical laserable material of the present invention, with curves $d$ and $f$ which illustrate the viscosities attained by typical laserable materials of the aforesaid first and second copending applications respectively.

In addition to the desirable combination of high fluorescent lifetime and low viscosity attained by laserable materials of the present invention, the novel materials also have two additional advantages. One of these is that the concentration of trivalent neodymium or other active laser ions (i.e. the number of ions per unit volume of the material) may be substantially higher than in certain prior art materials before the appearance of concentration quenching begins to be evident. For example concentration quenching in a silicate glass containing only monovalent potassium as the alkali ion takes place at a concentration of approximately 2.5 weight percent of neodymium oxide. Laserable materials of the present invention have concentrations of as much as 5 weight percent (1.8 mol percent) neodymium oxide before concentration quenching becomes a factor.

The second advantage of the present laserable materials is that, compared to some prior art materials, the present materials operate more easily to attain a 4-level energy system. Referring to the energy level diagram of FIG. 1 applicable to a trivalent neodymium doped silicate glass, absorption of pumping photonic light energy from the $^4I_{9/2}$ level to a typical excited state level is represented by the arrow W. Non-radiative transitions represented by the wavy-line arrow S carry the ion to the $^4F_{3/2}$ energy state from which fluorescence originates when the ion emits a quantum of light in going to either the $^4I_{13/2}$, $^4I_{11/2}$ or $^4I_{9/2}$ state as represented by the respective arrows $W_1$, $W_2$, and $W_3$. Depending on the precise glass composition, these three emissions may appear as broad bands or they may appear as double lines. For the compositions that give double lines, each of the three $^4I$ states can be considered to be split into two states. When such a splitting occurs it is possible to obtain laser action for the transition that terminates in the $^4I_{9/2}$ (2) level. For such an application, it is desirable to have the splitting, E, as large as possible to gain all of the benefits of a 4-level system. The present laserable materials facilitate attaining this desirable 4-level energy system with its well known advantages. For example in a typical laserable material of this invention, a value of E of 450 cm.$^{-1}$ has been attained.

The laserable silicate glass compositions of this invention have silicon oxide compositions within the range from 63 to 83 mol percent. The compositions also include fluxes comprising monovalent alkali-oxides within the range from 14 to 33 mol percent and, glass modifying agents comprising divalent metal oxides within the range of 1.9–3 mol percent. The selected alkali oxides have a definite effect on the fluorescent lifetimes and viscosities attained by laserable materials. That is, use of oxides of the heavier monovalent alkalies tend to increase the fluorescent lifetimes of the materials and to increase the viscosities of the materials. The use of oxides of lighter monovalent alkalies tend to decrease the fluorescent lifetimes of the laserable materials and to decrease the viscosities of the materials. The selected divalent metal oxides also have a definite effect on the fluorescent lifetimes and viscosities attained by the silicate glasses. These divalent metal oxides are necessary to promote the stability of the glasses but their use tends to somewhat reduce the fluorescent lifetimes of the glasses. The oxides of the heavier divalent metals barium and lead have a lesser effect in this regard than the lighter divalent metal oxides sometimes used in silicate glasses.

Because of these factors it is an important part of this invention that the monovalent alkali oxide content of the silicate glasses compose approximately 1.8 to 3.3 mol percent selected from the group consisting of rubidium oxide and cesium oxide and mixtures thereof. According to this invention, the silicate glasses must also include between approximately 5.5 to 10 mol percent of sodium oxide as part of the monovalent oxide content of the glasses. The remainder of said monovalent oxide content is to be made up of potassium oxide. In order to achieve the objectives of this invention, the divalent metal oxide content of the glasses must then be made up of barium oxide, lead oxide or mixtures thereof within the range from about 1.9 to 3 mol percent. These divalent metal oxides are to be present within ranges from approximately 0 to 3 mol percent for barium oxide and from approximately 0 to 3 mol percent for lead oxide. The laserable materials provided by this invention also include an active laser ingredient, preferably comprising trivalent neodymium oxide, within the range from approximately 0.5 to 2 mol percent. Although trivalent neodymium oxide comprises the preferred active laser ingredient of glasses of this invention, other active laser ingredients may be used within the ranges specified. For example numerous lanthanide and actinide elements as more fully disclosed in the copending application of Elias Snitzer, Ser. No. 168,012, filed Jan. 16, 1962, and assigned to the same assignee as the present application may also be used. In particular, the active laser ingredient may be selected from the group consisting of neodymium+++, erbium+++, samarium+++, thulium+++, uranium+++, europium++, europium+++, praseodymium+++, terbium+++, holmium+++, dyprosium+++, ytterbium+++, and cerium+++, and mixtures thereof.

In addition to the ingredients required in glasses of this invention, antimony oxide is preferably incorporated in the glasses within the range of approximately 0 to 0.4 mol percent as a fining agent. Antimony oxide can also be partially or wholly replaced with arsenic trioxide, sodium chloride, cerium oxide and sodium sulfate and other known fining agents on a molar basis within the scope of this invention. The glasses can also incorporate titanium dioxide, cerium dioxide or mixtures thereof within the range of approximately 0 to 0.4 mol percent for stabilizing the glasses against solarization.

Specific examples of laserable silicate glass materials embodying the present invention have constituent compositions as follows:

|  | Example A | | Example B | | Example C | | Example D | | Example E | | Example F | | Example G | |
| --- | --- | --- | --- | --- | --- | --- | --- | --- | --- | --- | --- | --- | --- | --- |
|  | Weight percent | Mol percent | Weight percent | Mol percent | Weight percent | Mol percent | Weight percent | Mol percent | Weight percent | Mol percent | Weight percent | Mol percent | Weight percent | Mol percent |
| $SiO_2$ | 69.39 | 82.04 | 68.39 | 81.65 | 67.51 | 81.30 | 64.00 | 63.87 | 69.00 | 69.82 | 67.77 | 82.07 | 72.00 | 82.45 |
| $Na_2O$ | 4.88 | 5.59 | 4.88 | 5.64 | 4.88 | 5.69 | 5.00 | 9.67 | 5.00 | 9.80 | 4.76 | 5.59 | 5.00 | 5.54 |
| $K_2O$ | 9.78 | 7.37 | 9.78 | 7.44 | 9.78 | 7.51 | 15.00 | 19.09 | 10.00 | 12.90 | 9.54 | 7.37 | 10.00 | 7.30 |
| $Rb_2O$ | 4.88 | 1.85 | 4.88 | 1.87 | 4.88 | 1.88 | 5.00 | 3.20 | 5.00 | 3.25 |  |  | 5.00 | 1.84 |
| $Cs_2O$ |  |  |  |  |  |  |  |  |  |  | 7.16 | 1.85 |  |  |
| PbO | 7.10 | 2.26 | 7.10 | 2.28 | 7.10 | 2.30 |  |  |  |  | 6.93 | 2.26 |  |  |
| BaO |  |  |  |  |  |  | 5.00 | 1.95 | 5.00 | 1.98 |  |  | 5.00 | 2.24 |
| $Sb_2O_3$ | 0.97 | 0.23 | 0.97 | 0.23 | 0.97 | 0.24 | 1.00 | 0.41 | 1.00 | 0.41 | 0.92 | 0.23 | 1.00 | 0.23 |
| $Nd_2O_3$ | 3.00 | 0.63 | 4.00 | 0.85 | 4.88 | 1.04 | 5.00 | 1.78 | 5.00 | 1.80 | 2.92 | 0.63 | 2.00 | 0.40 |
| γ | 820 | | 820 | | 800 | | 730 | | 780 | |  | | 750 | |

The glass-making raw materials listed in the foregoing glass compositions must be of high purity, and in particular they must be free as practicable of contamination by iron or other elements which would cause light absorption at 1.06 micron wavelength if they were present in the finished laserable material. The silica, for example, should not contain more than 5 parts per million of iron as $Fe_2O_3$ while the other raw materials, used in smaller quantities in the batch, should not contain more than 8–10 parts per million of iron as $Fe_2O_3$. These laser glasses may be prepared by fusing the raw materials in a platinum crucible heated in a silicon carbide resistance type of electric furnace. No special atmosphere is necessary in the furnace. The raw materials are mixed intimately and completely in a mixing device that does not introduce any contamination. The mixed batch is loaded into the platinum crucible, or a high purity ceramic crucible which will not contaminate the melt by introducing iron or any other element which will absorb light at 1.06 micron wavelength if present in the finished glass. The crucible should be at a temperature of approximately 1400°–1450° C. when the raw material is charged, the loading operation taking approximately two hours since the level in the crucible drops as the batch materials fuse together to form the glass and thus require the addition of more batch. When the charging of the batch is completed, the temperature of the melt is slightly lowered to approximately 1350°–1375° C. and held at this level until the melt is free of bubbles. The molten glass is then stirred at this temperature for about two to three hours to free the melt of striae. The temperature of the glass is then lowered to approximately 1150°–1200° C. where it is maintained for a period of about one hour before casting. The temperature value last recited is suitable for a melt of about 1 lb. but it will be understood that the preferred temperature at casting is a function of the size of the cast with larger casts requiring lower temperatures for control of the glass. The glass may be cast in a cast iron mold, and is transferred to an annealing oven just as soon as it has cooled enough to maintain its shape. The glass is annealed at a temperature of approximately 450°–500° C. for a period of one hour and is then cooled down slowly overnight to room temperature.

It will be apparent from the foregoing description of the invention that a silicon glass laserable material embodying the invention is characterized by substantially improved values of fluorescent lifetime and thus exhibits improved energy storage capacity per unit volume of material and, at the same time, is characterized by significantly reduced processing viscosity. A laserable material embodying the invention accordingly exhibits improved laser characteristics yet may be fabricated by conventional processing techniques and equipments.

I claim:

1. A laserable material consisting essentially of a silicate glass of the following composition: a silicon dioxide, $SiO_2$, content within the range of approximately 63–83 mol percent; a divalent metal oxide content within the range of approximately 1.9–3 mol percent, said divalent metal oxide being selected from the group consisting of barium oxide and lead oxide and mixtures thereof; a monovalent alkali-metal oxide content within the range of approximately 14–33 mol percent, said monovalent alkali-metal oxide content comprising approximately 1.8–3.3 mol percent of a member selected from the group consisting of rubidium oxide and cesium oxide and mixtures thereof, approximately 5.5–10 mol percent of sodium oxide, and the remainder of said monovalent alkali-metal oxide content being potassium oxide; and a neodymium oxide content within the range of approximately 0.5–2 mol percent.

2. A laserable material consisting essentially of a silicate glass of the following composition: a silicon dioxide, $SiO_2$, content within the range of approximately 63–83 mol percent; a divalent metal oxide content within the range of approximately 1.9–3 mol percent, said divalent metal oxide being selected from the group consisting of barium oxide and lead oxide and mixtures thereof; a monovalent alkali-metal oxide content within the range of approximately 14–33 mol percent, said monovalent alkali-metal oxide content comprising approximately 1.8–3.3 mol percent of a member selected from the group consisting of rubidium oxide and cesium oxide and mixtures thereof, approximately 5.5–10 mol percent of sodium oxide and the remainder of said monovalent alkali-metal oxide content being made up of potassium oxide;

a fining agent within the range of approximately 0–0.4 mol percent, said fining agent being selected from the group consisting of antimony oxide, arsenic trioxide, sodium chloride, cerium oxide and sodium sulfate; and a trivalent neodymium oxide content within the range of approximately 0.5–2 mol percent.

3. A laserable material consisting essentially of a silicate glass of the following composition: a silicon dioxide, $SiO_2$, content within the range of approximately 63–83 mol percetnt; a divalent metal oxide content within the range of approximately 1.9–3 mol percent, said divalent metal oxide being selected from the group consisting of barium oxide and lead oxide and mixtures thereof; a monovalent alkali-metal oxide content within the range of approximately 14–33 mol percent, said monovalent alkali-metal oxide content comprising approximately 1.8–3.3 mol percent of a member selected from the group consisting of rubidium oxide and cesium oxide and mixtures thereof, approximately 5.5–10 mol percent of sodium oxide, and the remainder of said monovalent alkali-metal oxide content being made up of potassium oxide; a stabilizing agent within the range of approximately 0–0.4 mol percent, said stabilizing agent being selected from the group consisting of titanium dioxide and cerium dioxide and mixtures thereof; and a trivalent neodymium oxide content within the range of approximately 0.5–2 mol percent.

4. A laserable material consisting essentially of a silicate glass of the following composition: a silicon dioxide, $SiO_2$, content within the range of approximately 63–83 mol percent; a barium oxide content within the range of approximately 1.9–2.25 mol percent; a monovalent alkali-metal oxide content within the range of approximately 14–33 mol percent, said monovalent alkali-metal oxide comprising approximately 1.8–3.3 mol percent selected from the group consisting of rubidium oxide and cesium oxide and mixtures thereof, approximately 5.5–10 mol percent of sodium oxide, and the remainder of said monovalent alkali-metal oxide content being made up of potassium oxide; and a trivalent neodymium oxide content within the range of approximately 0.5–2 mol percent.

5. A laserable material consisting essentially of a silicate glass of the following composition: a silicon dioxide, $SiO_2$, content within the range of approximately 63–83 mol percent; a lead oxide content within the range of approximately 2.2–2.3 mol percent; a monovalent alkali-metal oxide content within the range of approximately 14–33 mol percent, said monovalent alkali-metal oxide content comprising approximately 1.8–3.3 mol percent of a member selected from the group consisting of rubidium oxide and cesium oxide and mixtures thereof, approximately 5.5–10 mol percent of sodium oxide, and the remainder of said monovalent alkali-metal oxide content being made up of potassium oxide; and a trivalent neodymium oxide content within the range of approximately 0.5–2 mol percent.

6. A laserable material consisting essentially of a silicate glass of the following composition: a silicon dioxide, $SiO_2$, content within the range of approximately 63–83 mol percent; a barium oxide content of 1.98 mol percent, a rubidium oxide content of 3.25 mol percent, a sodium oxide content of 9.8 mol percent, a potassium oxide content of 12.9 mol percent, and a trivalent neodymium oxide content of 1.8 mol percent.

7. A laserable material consisting essentially of a silicate glass of the following composition: a silicon dioxide, $SiO_2$, content of approximately 63–83 mol percent; a lead oxide content of 2.3 mol percent, a rubidium oxide content of 1.88 mol percent, a sodium oxide content of 5.69 mol percent, a potassium oxide content of 7.51 mol percent, and a trivalent neodymium oxide content of 0.85 mol percent.

8. A laserable material consisting essentially of a silicate glass of the following composition: a silicon dioxide, $SiO_2$, content of approximately 63–83 mol percent; a lead oxide content of 2.26 mol percent, a cesium oxide content of 1.85 mol percent, a sodium oxide content of 5.59 mol percent, a potassium oxide content of 7.37 mol percent, and a trivalent neodymium oxide content of 0.63 mol percent.

References Cited

Hireyamal et al.: The Effect of Neodymium Environment on Its Absorption and Emission Characteristics in Glass—Physics and Chemistry of Glasses vol. 5, No. 2, April 1964, pages 44–51.

TOBIAS E. LEVOW, Primary Examiner

R. D. EDMONDS, Assistant Examiner

U.S. Cl. X.R.

106—52, 53